(12) United States Patent
Honda

(10) Patent No.: US 11,228,690 B2
(45) Date of Patent: Jan. 18, 2022

(54) IMAGE READING APPARATUS AND METHOD OF CALCULATING MEDIUM INCLINATION IN IMAGE READING APPARATUS

(71) Applicant: SEIKO EPSON CORPORATION, Tokyo (JP)

(72) Inventor: Daisuke Honda, Munakata (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/004,389

(22) Filed: Aug. 27, 2020

(65) Prior Publication Data
US 2021/0067646 A1 Mar. 4, 2021

(30) Foreign Application Priority Data
Aug. 30, 2019 (JP) ................... 2019-157796

(51) Int. Cl.
*H04N 1/00* (2006.01)

(52) U.S. Cl.
CPC ..... *H04N 1/00718* (2013.01); *H04N 1/00602* (2013.01); *H04N 1/00729* (2013.01); *H04N 1/00774* (2013.01)

(58) Field of Classification Search
CPC .... H04N 1/0473; H04N 1/1013; H04N 1/193; H04N 2201/0081; H04N 1/001; H04N 1/00809; H04N 1/00811; H04N 1/00816; H04N 1/02409; H04N 1/02481; H04N 1/0249; H04N 1/192; H04N 1/1933; H04N 1/3876; H04N 1/3878; H04N 1/4092;
(Continued)

(56) References Cited

U.S. PATENT DOCUMENTS 4,777,585 A * 10/1988 Kokawa ............. G05B 13/0275
706/52
5,285,279 A * 2/1994 Sakamoto ............. H04N 5/211
348/614
(Continued)

FOREIGN PATENT DOCUMENTS

JP 2016-184827 10/2016
JP 2019-029816 2/2019
(Continued)

*Primary Examiner* — Negussie Worku
(74) *Attorney, Agent, or Firm* — Workman Nydegger

(57) ABSTRACT

An image reading apparatus has: electrodes that come into contact with a medium during transport; charge detection circuits, each of which corresponds to one of the electrodes; a reader, and a controller. The controller executes inclination inference processing for calculating the inclination of the medium with respect to a transport path as an inferred inclination value according to a signal from each charge detection circuit, inclination detection processing for deriving the inclination of the medium with respect to the transport path as a detected inclination value according to the result of reading by the reader, and correction value deriving processing for storing a correction value based on the difference between the detected inclination value and the inferred inclination value in a storage section. In inclination inference processing with the correction value stored in the storage section, the inferred inclination value is calculated in consideration of the correction value.

9 Claims, 10 Drawing Sheets

(58) Field of Classification Search
CPC ............... H04N 1/506; H04N 1/6033; H04N 2201/0094; H04N 1/00602; H04N 1/00718; H04N 1/00729; H04N 1/00774; B41J 11/0095; B41J 2/2146; B41J 11/007; B41J 11/009; B41J 11/46; B41J 13/0009; B41J 13/0027; B41J 15/165; B41J 2202/20; B41J 2202/21; B41J 25/001; B41J 29/393; B41J 2/04508; B41J 2/04556; B41J 2/04586; B41J 2/145; G07D 7/0034; G07D 7/12; G07D 7/206; G07F 17/32; G07F 17/3239; G07F 17/3246; B65H 2301/4493; B65H 23/1806; B65H 23/1888; B65H 23/1955; B65H 23/198; B65H 2404/62; B65H 2513/104; B65H 2513/11; B65H 2513/514; B65H 2515/116; B65H 2515/31; B65H 2553/30; B65H 2553/41; B65H 2801/03; B65H 7/02; G01S 15/06; G01S 15/10; G01S 15/87; G01S 15/88; G01S 7/52004; G01S 7/521; G01S 7/527; G06T 5/001

USPC ....................................................... 358/474
See application file for complete search history.

(56) References Cited

U.S. PATENT DOCUMENTS

| | | | | |
|---|---|---|---|---|
| 5,434,926 | A | * | 7/1995 | Watanabe ............... H03G 3/32 381/108 |
| 5,761,387 | A | * | 6/1998 | Yamada ........... G05B 19/41865 706/45 |
| 8,824,024 | B2 | * | 9/2014 | Kuno ................ H04N 1/00737 358/475 |
| 9,531,913 | B1 | * | 12/2016 | Shiraishi ................ H04N 1/193 |
| 2005/0104282 | A1 | * | 5/2005 | Mandai .................... B65H 5/00 271/227 |
| 2007/0055724 | A1 | * | 3/2007 | Harada .................... B41J 11/46 708/800 |
| 2015/0264190 | A1 | * | 9/2015 | Arai ..................... H04N 1/4092 358/1.15 |
| 2016/0167365 | A1 | * | 6/2016 | Hirabayashi ......... B41J 2/04508 347/14 |
| 2016/0282792 | A1 | | 9/2016 | Nakata |
| 2019/0037092 | A1 | | 1/2019 | Shiota |
| 2019/0281185 | A1 | * | 9/2019 | Takizawa ............... H04N 1/401 |
| 2019/0283466 | A1 | * | 9/2019 | Watanabe ............ B41J 2/04556 |
| 2020/0410217 | A1 | * | 12/2020 | Sugimoto ............... G06F 3/012 |

FOREIGN PATENT DOCUMENTS

| | | |
|---|---|---|
| JP | 2021-036637 | 3/2021 |
| JP | 2021-036638 | 3/2021 |

* cited by examiner

IMAGE READING APPARATUS AND METHOD OF CALCULATING MEDIUM INCLINATION IN IMAGE READING APPARATUS

The present application is based on, and claims priority from JP Application Serial Number 2019-157796, filed Aug. 30, 2019, the disclosure of which is hereby incorporated by reference herein in its entirety.

BACKGROUND

1. Technical Field

The present disclosure relates to an image reading apparatus and a method of calculating a medium inclination in the image reading apparatus.

2. Related Art

JP-A-2016-184827 discloses an example of an image reading apparatus that causes a reader to read an image on a medium transported along a predetermined transport path and creates image data according to the image data. In this image reading apparatus, detection sensors are provided on the transport path between the reader and a holder in which the medium is stored. The inclination of the medium is measured with respect to the transport path according to times at which the detection sensors detect the medium.

A position at which the medium comes into contact with a portion of the detection sensor, the portion being referred to as the contact portion, may be displaced from a predetermined designed position. In this case, there is a risk that, when the inclination of medium with respect to the transport path is derived according to the result of detection by the detection sensor, accuracy in the derivation is lowered.

SUMMARY

An image reading apparatus that solves the above problem has: a reader that reads an image on a medium transported along a transport path; a supply roller disposed upstream of the reader on the transport path, the supply roller being rotated to transport the medium; a plurality of electrodes disposed between the supply roller and the reader on the transport path, the plurality of electrodes having conductivity; a first charge detection circuit that, when the medium comes into contact with a first electrode of the plurality of electrodes, outputs a signal with a magnitude matching the amount of movement of charge from the medium to the first electrode; a second charge detection circuit that, when the medium comes into contact with a second electrode of the plurality of electrodes, the second electrode being disposed at a position different from the position of the first electrode in the width direction of the medium, outputs a signal with a magnitude matching the amount of movement of charge from the medium to the second electrode; and a controller that executes inclination inference processing for calculating the inclination of the medium with respect to the transport path as an inferred inclination value, according to a change in the signal output from the first charge detection circuit and to a change in the signal output from the second charge detection circuit. Each of the first electrode and second electrode has a plurality of fibers having conductivity. The controller executes inclination detection processing for, when the reader reads an image on the medium, deriving the inclination of the medium with respect to the transport path as a detected inclination value according to the result of the reading. The controller also executes correction value deriving processing for deriving a correction value so that the larger the difference between the detected inclination value and the inferred inclination value is, the greater the correction value is, and then for storing the correction value in a storage section. In addition, when, in the inclination inference processing, the correction value is stored in the storage section, the controller also uses the correction value to calculate the inferred inclination value.

A method of calculating a medium inclination in an image reading apparatus that solves the above problem is applied to an image reading apparatus that has: a reader that reads an image on a medium transported along a transport path; a supply roller disposed upstream of the reader on the transport path, the supply roller being rotated to transport the medium; a plurality of electrodes disposed between the supply roller and the reader on the transport path, the plurality of electrodes having conductivity; a first charge detection circuit that, when the medium comes into contact with a first electrode of the plurality of electrodes, outputs a signal with a magnitude matching the amount of movement of charge from the medium to the first electrode; and a second charge detection circuit that, when the medium comes into contact with a second electrode of the plurality of electrodes, the second electrode being disposed at a position different from the position of the first electrode in the width direction of the medium, outputs a signal with a magnitude matching the amount of movement of charge from the medium to the second electrode; each of the first electrode and second electrode has a plurality of conductive fibers having conductivity. In this method, a controller in the image reading apparatus is caused to execute: an inclination inference step of calculating the inclination of the medium with respect to the transport path as an inferred inclination value, according to a change in the signal output from the first charge detection circuit and to a change in the signal output from the second charge detection circuit; an inclination detection step for deriving, when the reader reads an image on the medium, the inclination of the medium with respect to the transport path as a detected inclination value according to the result of the reading; and a correction value deriving step of deriving a correction value so that the larger the difference between the detected inclination value and the inferred inclination value is, the greater the correction value is, and then of storing the correction value in a storage section. In addition, when, in the inclination inference step, the correction value is stored in the storage section, the correction value is also used to calculate the inferred inclination value.

DESCRIPTION OF EXEMPLARY EMBODIMENTS

An embodiment of an image reading apparatus and a method of calculating a medium inclination in the image reading apparatus will be described with reference to FIGS. 1 to 15.

Figure 1:
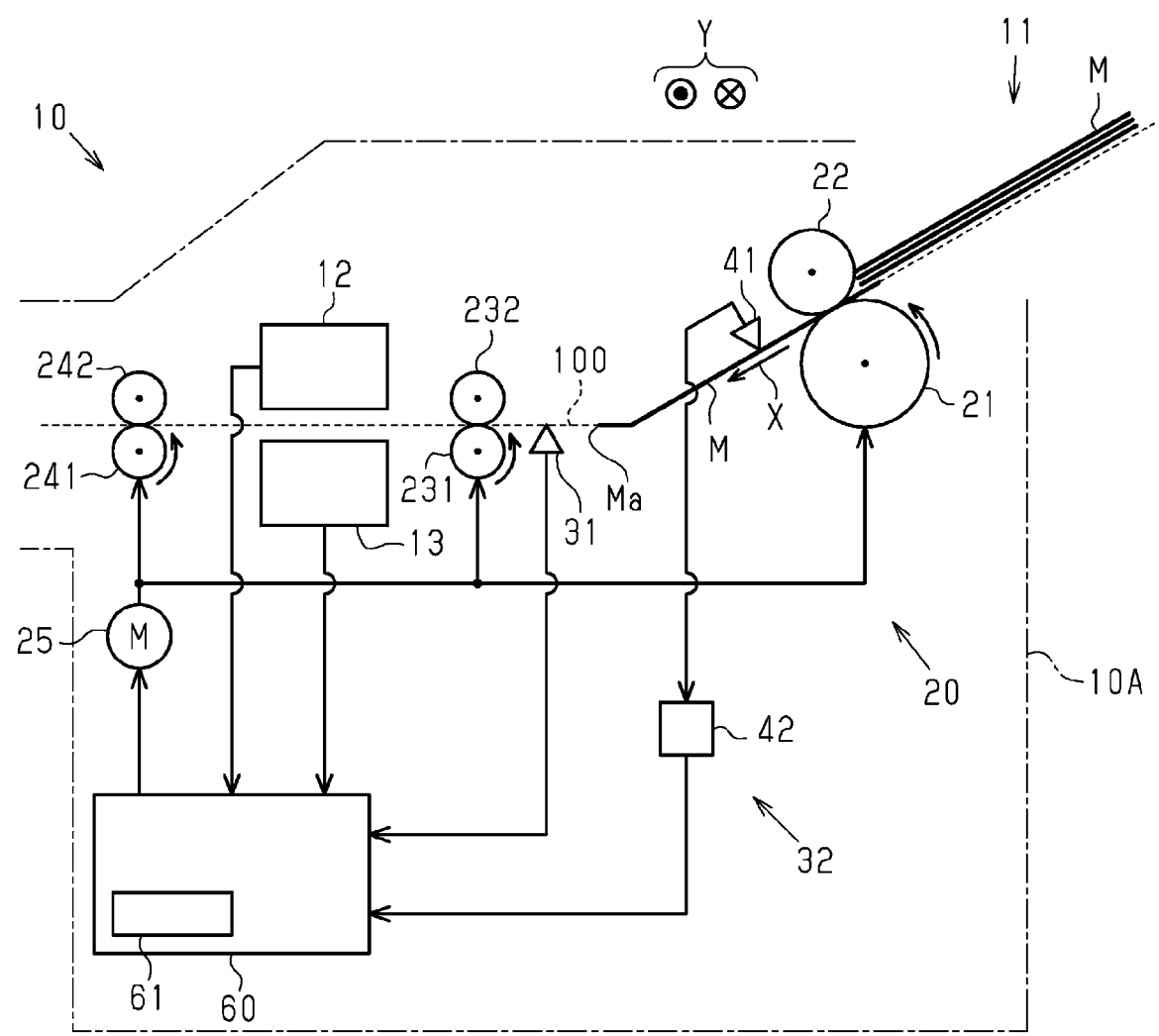
FIG. 1 is a schematic side view of an image reading apparatus in an embodiment.

The image reading apparatus 10 in this embodiment has a case 10A, a medium holder 11 that holds a stack of media M, and a medium transporting device 20 that transports a medium M held in the medium holder 11 along a transport path 100, as illustrated in FIG. 1. The medium transporting device 20 is disposed in the case 10A. An example of the medium M is an insulative medium such as paper.

The image reading apparatus 10 also has readers, each of which reads an image on the medium M transported along the transport path 100. In the example in FIG. 1, the readers in the image reading apparatus 10 are a first reader 12 that reads an image on the front surface of the medium M and a second reader 13 that reads an image on the rear surface of the medium M.

The medium transporting device 20 has a supply roller 21 that feeds the medium M held in the medium holder 11 towards the readers 12 and 13, and also has a nipper 22 that nips the medium M in cooperation with the supply roller 21. Examples of the nipper 22 are a separation roller and a separation plate. When a separation roller is used as the nipper 22, the rotation of the separation roller may be restricted. Alternatively, the separation roller may be rotated in a direction opposite to the rotational direction in which the medium M is transported toward the downstream X of the transport direction.

In the medium transporting device 20 in this embodiment, the medium M is nipped by the supply roller 21 and nipper 22. When the supply roller 21 is rotated, the medium M is fed toward the downstream X of the transport direction. At this time, the medium M rubs against both the supply roller 21 and the nipper 22, generating static electricity between the medium M and the supply roller 21 and between the medium M and the nipper 22. As a result, both the front surface and rear surface of the medium M are charged.

The medium transporting device 20 has transport rollers 231 and 232 disposed between the supply roller 21 and the readers 12 and 13 in the transport direction for the medium M. The medium transporting device 20 also has discharge rollers 241 and 242 disposed downstream X of the readers 12 and 13 in the transport direction.

The medium transporting device 20 has a driving motor 25 by which the supply roller 21, transport rollers 231 and 241 are rotated. An output from the driving motor 25 is transmitted to the supply roller 21 and transport rollers 231 and 241, by which the supply roller 21, transport rollers 231 and 232, and discharge rollers 241 and 242 are rotated. Therefore, the medium M is transported along the transport path 100 from the upstream in the transport direction toward the downstream.

The medium transporting device 20 in this embodiment has a plurality of detection sensors, denoted 31 and 32, that detect the medium M transported along the transport path 100 from the upstream in the transport direction toward the downstream. The detection sensor 31 is disposed upstream of the transport rollers 231 and 232 in the transport direction. The detection sensor 31 detects the front edge Ma of the medium M. When the front edge Ma of the medium M is detected by the detection sensor 31, the readers 12 and 13 start reading images on the medium M.

Figure 2:
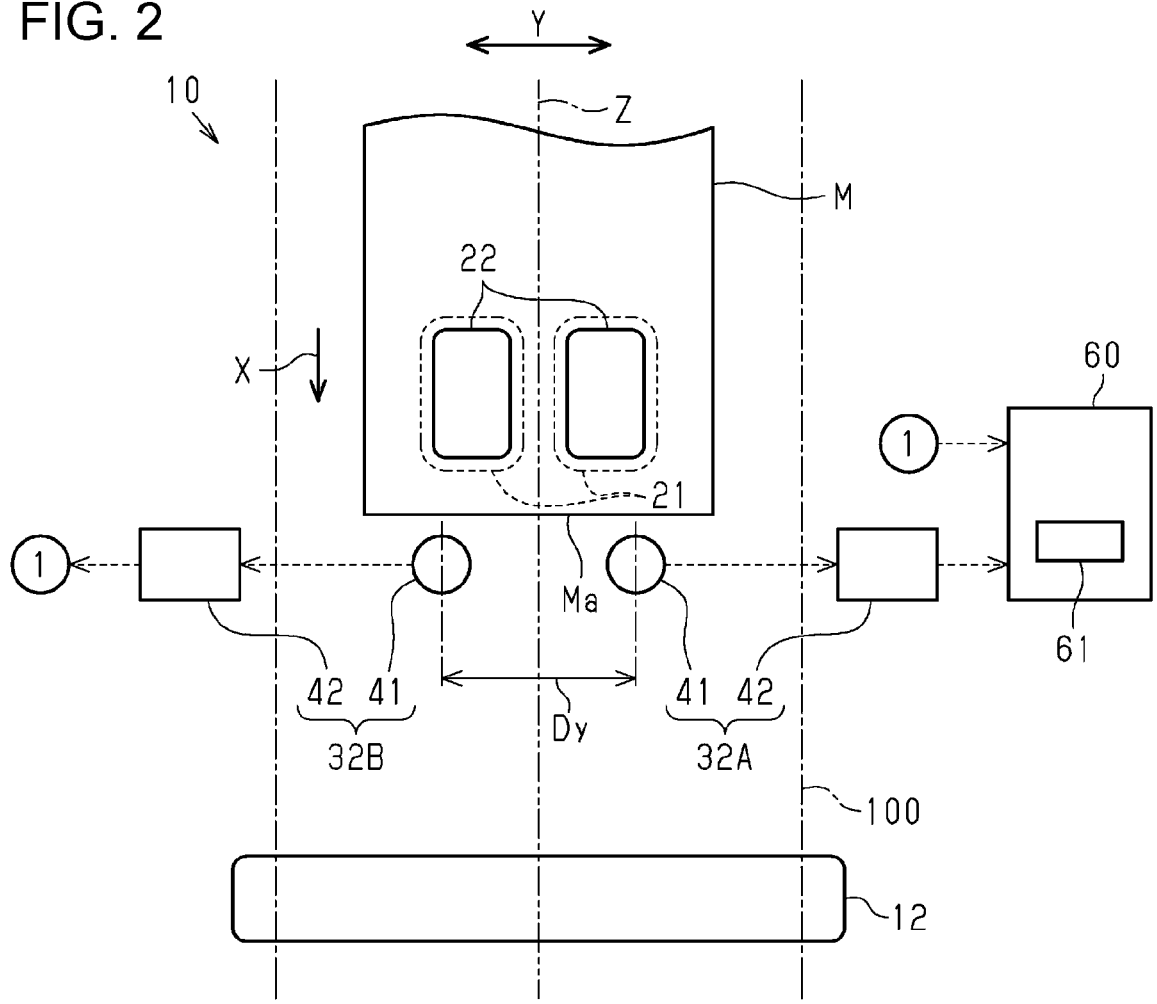
FIG. 2 is a schematic plan view of part of the image reading apparatus.

As illustrated in FIG. 2, the medium transporting device 20 has an electrostatic detection sensors 32A and 32B as the electrostatic detection sensor 32. Each of the electrostatic detection sensors 32A and 32B has an electrode 41 disposed between the nipper 22 and the detection sensor 31 in the transport direction, and also has a charge detection circuit 42 coupled to the electrode 41. The electrode 41 of the electrostatic detection sensor 32A and the electrode 41 of the electrostatic detection sensor 32B are disposed at the same position in the transport direction. However, these electrodes 41 are disposed at different positions in the width direction, which will be denoted Y, of the medium M transported along the transport path 100. In FIG. 2, the central axis Z of the transport path 100 is represented by a double-dot-dashed line. That is, the electrodes 41 are disposed so as to interpose the central axis Z between them in the width direction Y. The distance between the two electrodes 41 in the width direction Y will be referred to as the inter-electrode distance Dy.

In the example in FIG. 2, when the electrode 41 of the electrostatic detection sensor 32A, the electrode 41 being one of the two electrodes 41, is assumed to be equivalent to a first electrode, the electrode 41 of the electrostatic detection sensor 32B is equivalent to a second electrode. Similarly, the charge detection circuit 42 of the electrostatic detection sensor 32A is equivalent to a first charge detection circuit, and the charge detection circuit 42 of the electrostatic detection sensor 32B is equivalent to a second charge detection circuit.

Figure 3:
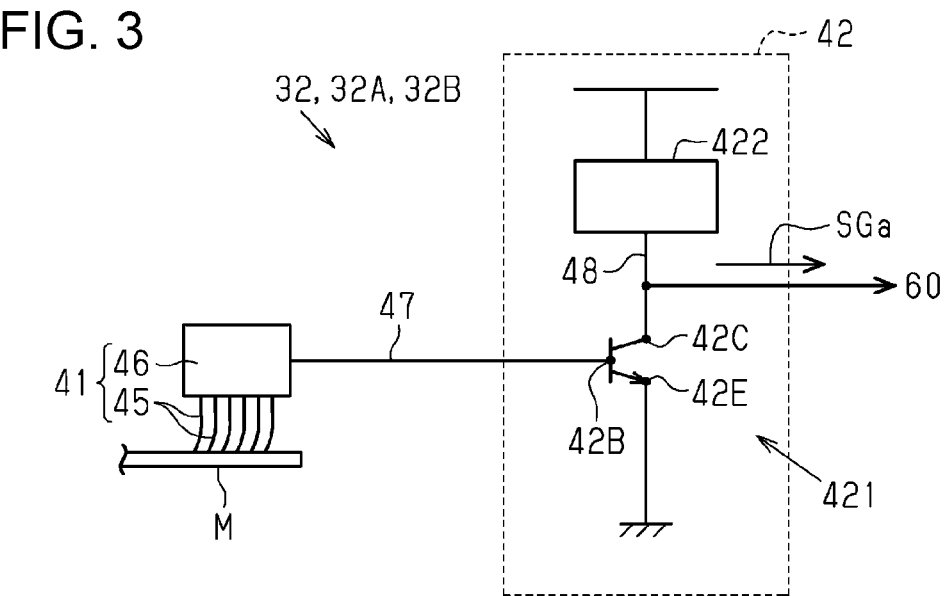
FIG. 3 schematically illustrates an example of an electrostatic detection sensor in the image reading apparatus.

As illustrated in FIG. 3, each electrode 41 has a base 46 and a plurality of fibers 45, the bottom ends of which are secured to the base 46. Each electrode 41 is structured so that, for example, the fibers 45 hang down from the base 46. Each fiber 45 is formed from a conductive material. That is, each electrode 41 is conductive. When the fiber 45 comes into contact with the medium M, therefore, charge on the medium M moves to the electrode 41. The charge that has moved to the electrode 41 further moves toward the charge detection circuit 42 through a wire 47.

An example of the charge detection circuit 42 is a common emitter as illustrated in FIG. 3.

The charge detection circuit 42 illustrated in FIG. 3 has a bipolar transistor 421. The electrode 41 is coupled to the base 42B of the bipolar transistor 421. The emitter 42E of the bipolar transistor 421 is grounded. A resistor 422 is coupled to the collector 42C of the bipolar transistor 421 through a wire 48. A controller 60 is coupled to the wire 48, which is positioned between the collector 42C and the resistor 422. That is, a signal with a magnitude matching the amount of charge that has moved from the medium M to the electrode 41 is entered into the base 42B of the bipolar transistor 421. Then, an amplified signal SGa, resulting from amplifying the signal entered into the base 42B, is output from the collector 42C of the bipolar transistor 421 to the controller 60. The controller 60 has a central processing unit (CPU) and a memory.

Figure 4:
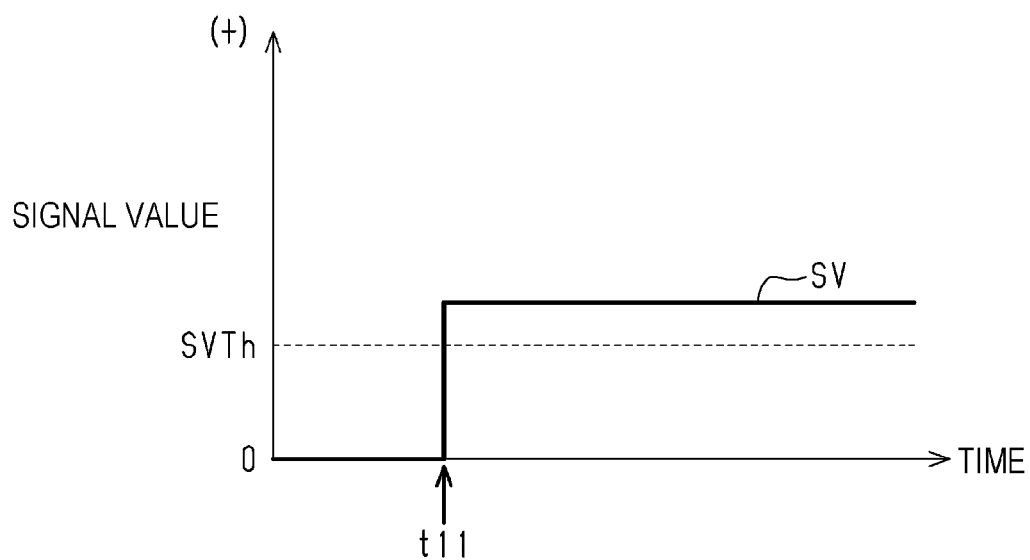
FIG. 4 is a timing diagram illustrating changes in a signal value, which is the magnitude of an amplified signal output from a charge detection circuit.

FIG. 4 illustrates changes in a signal value SV, which is the magnitude of the amplified signal SGa to be entered from the charge detection circuit 42 into the controller 60. Before time t11, either electrode 41 is not in contact with the medium M, so the signal value SV is smaller than a decision signal value SVTh as illustrated in FIG. 4. When the electrodes 41 come into contact with the medium M at time t11, the value of the signal value SV is increased. When the signal value SV is the decision signal value SVTh or more, the controller 60 can decide that the medium M is in contact with the electrodes 41. Specifically, in the example in FIG. 4, time t11 is a time at which the electrostatic detection sensor 32 detected the medium M.

Figure 5:
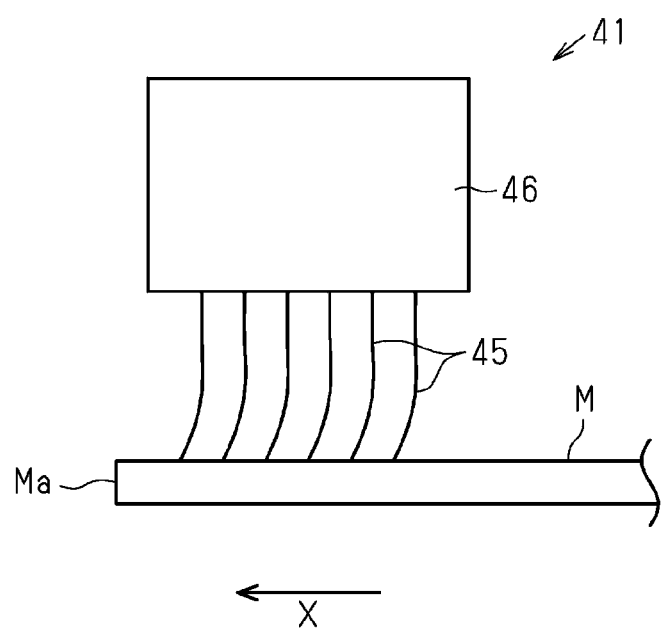
FIG. 5 schematically illustrates a state in which the fibers of the electrode of the electrostatic detection sensor are deformed.
Figure 7:
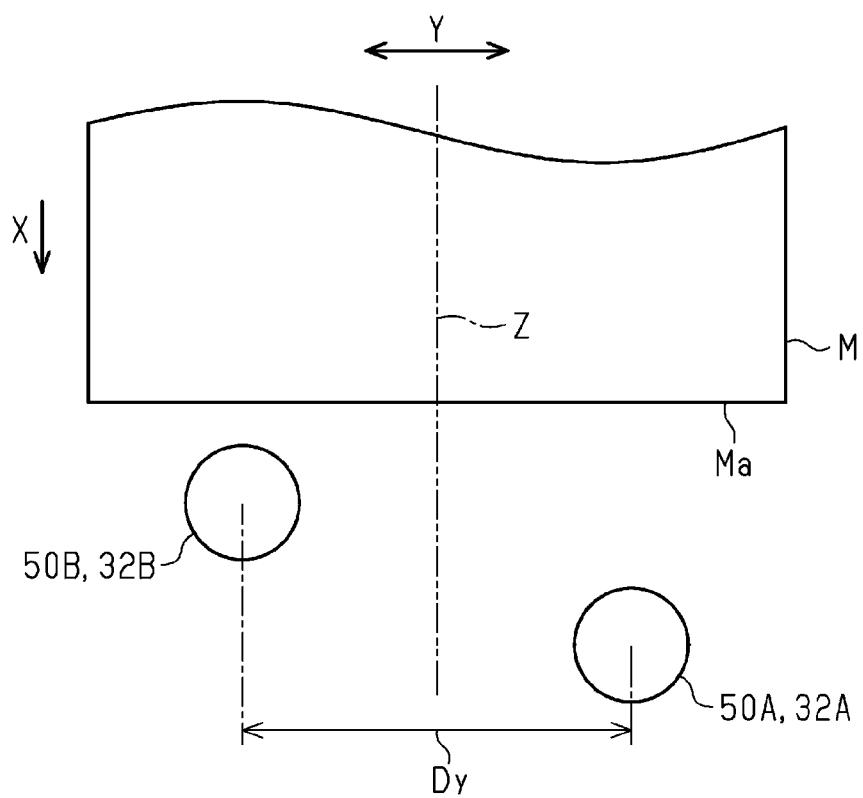
FIG. 7 schematically illustrates a state in which the positions of the contact portions of two electrostatic detection sensors differ from each other in a transport direction.

In this embodiment, each electrode 41 is a brash-like electrode having a plurality of fibers 45. Therefore, the electrode 41 changes with time. Basically, each fiber 45 of the electrode 41 deforms in such a way that the top of the fiber 45 is displaced toward the downstream X in the transport direction, as illustrated in FIG. 5. However, even when the electrodes 41 deform as illustrated in FIG. 5, the deformations of the electrodes 41 are not always at the same degree. In this case, although the base 46 of the electrode 41 in the electrostatic detection sensor 32A and the base 46 of the electrode 41 in the electrostatic detection sensor 32B are at the same position in the transport direction, a contact portion 50A, which comes into contact with the medium M, of the electrode 41 of the electrostatic detection sensor 32A and a contact portion 50B, which comes into contact with the medium M, of the electrode 41 of the electrostatic detection sensor 32B are at different positions in the transport direction as illustrated in FIG. 7.

Figure 6:
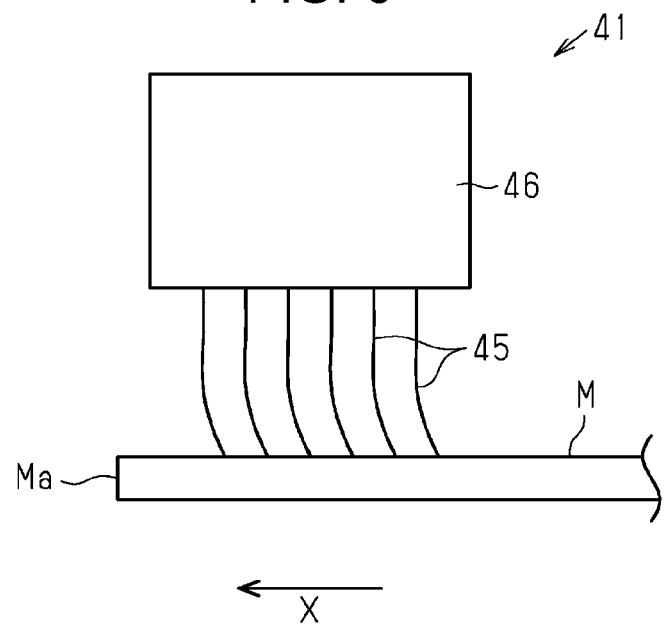
FIG. 6 also schematically illustrates a state in which the fibers of the electrode are deformed.

For the maintenance of the image reading apparatus 10 or another purpose, the user may insert a hand into the case 10A for the working. In this case, when the hand of the user touches the electrode 41, the electrode 41 may deform in such a way that, for example, the top of each fiber 45 is displaced toward the upstream in the transport direction as illustrated in FIG. 6. When one of the two electrodes 41 deforms as illustrated in FIG. 5 and the other electrode 41 deforms as illustrated in FIG. 6, the contact portion 50A of the electrode 41 of the electrostatic detection sensor 32A and the contact portion 50B of the electrode 41 of the electro-static detection sensor 32B are of course placed at different positions in the transport direction as illustrated in FIG. 7.

Figure 8:
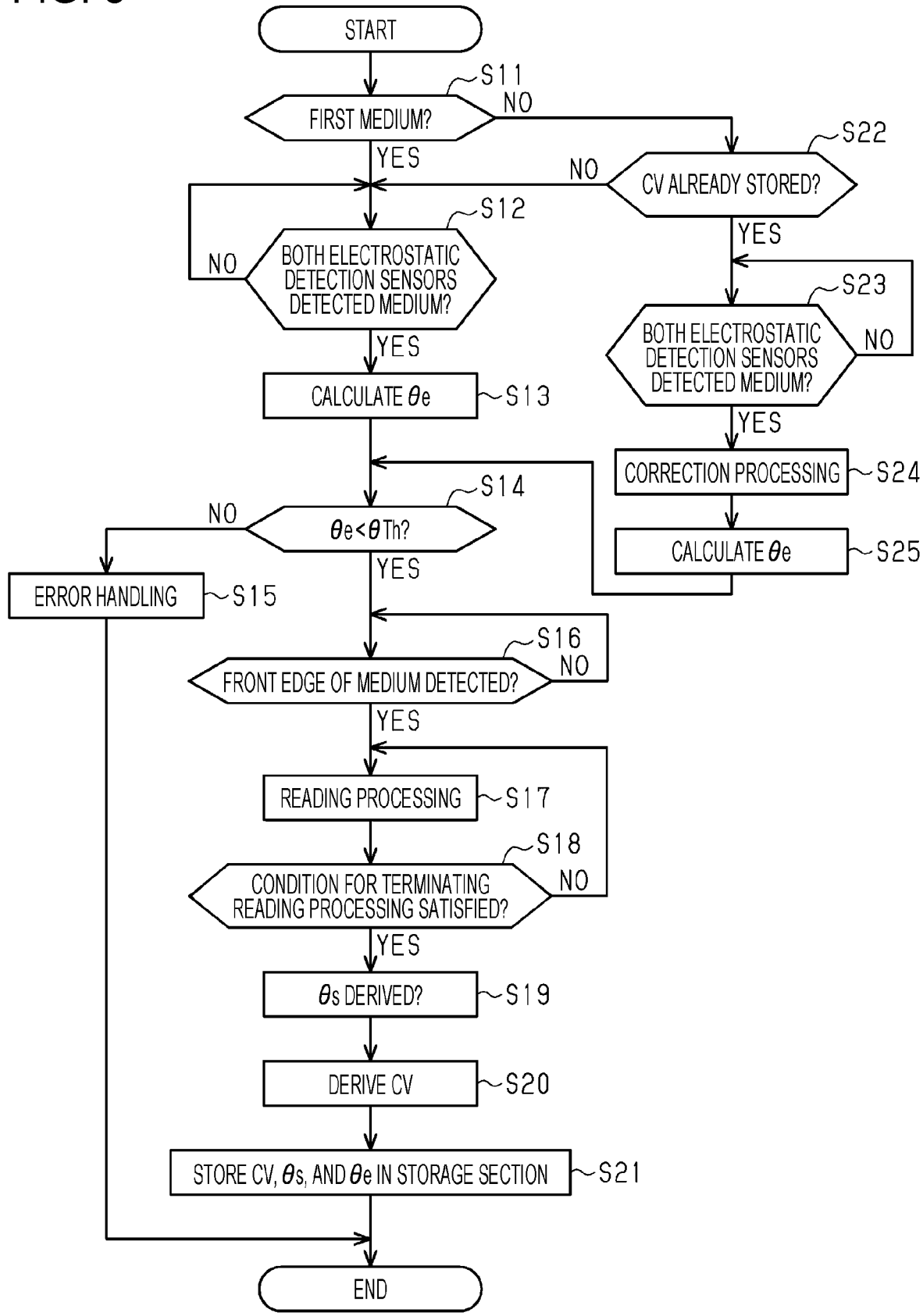
FIG. 8 is a flowchart of processing executed by a controller in the image reading apparatus.

Next, a flow of processing for deriving the inclination of the medium M with respect to the transport path 100 will be described with reference to FIGS. 8 to 15. Each processing in FIG. 8 is executed by the controller 60. That is, FIG. 8 is a flowchart illustrating a method of calculating the inclination of the medium M in the image reading apparatus 10.

When the transport of the medium M starts, a series of processing in FIG. 8 is executed. In step S11, which is a first step, a decision is made as to whether the transport is for a first medium M. The first medium M referred to here is a first medium M transported after the image reading apparatus 10 has been powered on. When the transport is for a first medium M (Yes in S11), the process proceeds to the next step S12. In step S12, a decision is made as to whether both the electrostatic detection sensors 32A and 32B have detected the medium M. When the signal value SV indicating the magnitude of the amplified signal SGa entered from the charge detection circuit 42 in the electrostatic detection sensor 32A is the decision signal value SVTh or more, the controller 60 decides that the electrostatic detection sensor 32A has detected the medium M. Similarly, when the signal value SV indicating the magnitude of the amplified signal SGa entered from the charge detection circuit 42 in the electrostatic detection sensor 32B is the decision signal value SVTh or more, the controller 60 decides that the electrostatic detection sensor 32B has detected the medium M.

When it is decided in step S12 that at least one of the electrostatic detection sensors 32A and 32B has not detected the medium M (No in S12), a decision in step S12 is repeatedly made until both the electrostatic detection sensors 32A and 32B detect the medium M. When it decided that both the electrostatic detection sensors 32A and 32B have detected the medium M (Yes in S12), the process proceeds to the next step S13. In step S13, inclination inference processing is executed in which an inferred inclination value θe is calculated as the inclination of the medium M with respect to the transport path 100. In this embodiment, step S13 is equivalent to an example of an inclination inference step in which the inclination of the medium M with respect to the transport path 100 is calculated as the inferred inclination value θe according to a change in a signal output from the first charge detection circuit and a change in a signal output from the second charge detection circuit. Specifically, step S13 is equivalent to an example of the inclination inference step executed when a correction value CV, which will be described later, is not stored in a storage section 61.

Figure 9:
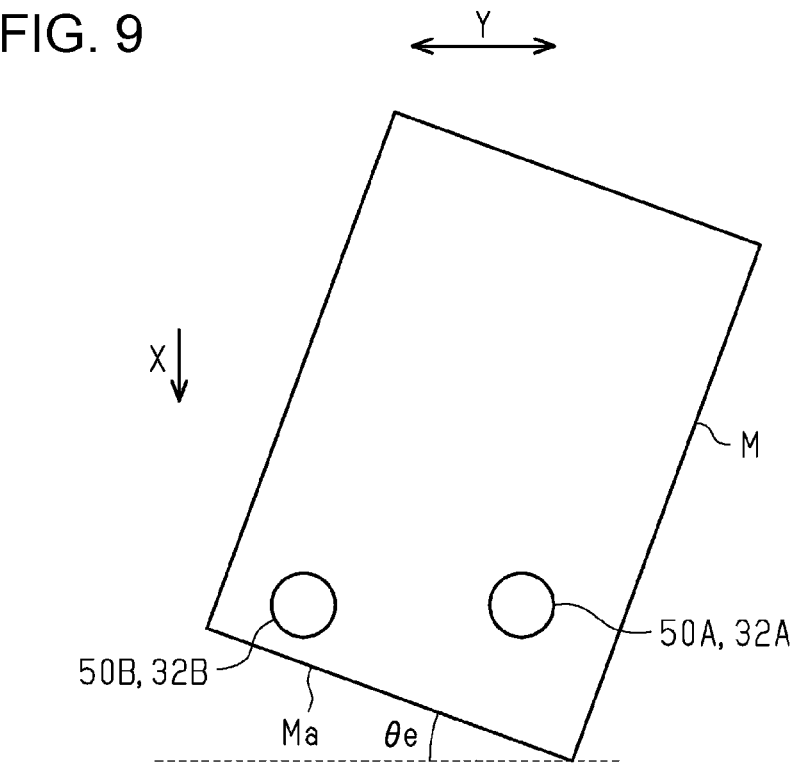
FIG. 9 schematically illustrates a state in which a medium is inclined with respect to the transport path.

In FIG. 9, an example of a state in which the medium M is inclined with respect to the transport path 100 is illustrated. The broken line in FIG. 9 extends in the width direction Y. Therefore, an inferred value for an angle formed by the broken line and the front edge Ma of the medium M is calculated as the inferred inclination value θe.

An example of inclination inference processing will be described below.

The electrostatic detection sensor 32A or 32B, whichever detected the medium M earlier, will be referred to a first sensor, and the electrostatic detection sensor 32A or 32B, whichever detected the medium M later, will be referred to a second sensor. For example, elapsed time T is acquired, elapsed time T being from a first point in time at which the first sensor detected the medium M to a second point in time at which the second sensor detected the medium M. When elapsed time T is acquired, in inclination inference processing, relational expression (1) below is used to calculate the inferred inclination value θe. In relational expression (1), S is the transport speed of the medium M and the inter-electrode distance Dy is a distance between the two electrodes 41 in the width direction Y. T·S in relational expression (1) is a value equivalent to an amount by which the medium M has been transported during measured elapsed time T. The larger the difference in time from the first point in time to the second point in time is, the larger the amount is. Therefore, the larger the difference in time is, the greater the inferred inclination value θe is.

$$\theta e = \arctan\left(\frac{T \cdot S}{Dy}\right) \quad (1)$$

Referring again to FIG. 8, upon the completion of the calculation of the inferred inclination value θe, the process proceeds to the next step S14. In step S14, a decision is made as to whether the inferred inclination value θe is smaller than an inclination decision value θTh. To protect the medium M, the inclination decision value θTh is set in advance as a decision reference as to whether to cease the transport of the medium M. When the inferred inclination value θe is decided to be equal to or greater than the inclination decision value θTh (No in S14), part of the medium M may be outside the transport path 100, so the process proceeds to the next step S15.

In step S15, error handling is executed. In an example in error handling, the transport of the medium M is ceased. In another example in error handling, it is indicated that the medium M during transport is inclined with respect to the transport path 100. After error handling has been executed, the series of processing in FIG. 8 is terminated.

When it is decided in step S14 that the inferred inclination value θe is smaller than the inclination decision value θTh (Yes in S14), the process proceeds to the next step S16. In step S16, a decision is made as to whether the front edge Ma of the medium M has been detected by the detection sensor 31. When the front edge Ma has not been detected (No in S16), a decision in step S16 is repeatedly made until the front edge Ma is detected. When the front edge Ma has been detected (Yes in S16), the process proceeds to the next step S17.

In step S17, reading processing in which the readers 12 and 13 each read an image on the medium M is executed. In the next step S18, a decision is made as to whether a condition for terminating the reading processing has been satisfied. When, for example, the readers 12 and 13 detected the bottom edge of the medium M, it is decided that the termination condition has been satisfied because further reading of the image is unnecessary. When the termination condition has not been satisfied (No in S18), the process returns to step S17 described above. That is, the reading processing is continued. When the termination condition has been satisfied (Yes in S18), the process proceeds to the next step S19. That is, the reading processing is terminated.

In step S19, the inclination of the medium M with respect to the transport path 100 is derived as a detected inclination value θs according to a reading result in reading processing, that is, an analysis result for image data obtained in reading processing. Since the detected inclination value θs is derived from an analysis result for image data, the accuracy of the detected inclination value θs is higher than accuracy with which the inferred inclination value θe is calculated. In this embodiment, therefore, step S19 is equivalent to an incli-nation detection step in which, when the readers 12 and 13 each read an image on the medium M, the inclination of the medium M with respect to the transport path 100 is derived as the detected inclination value θs according to the result of the reading. When the detected inclination value θs is derived, the process proceeds to the next step S20.

In step S20, the correction value CV is derived according to the detected inclination value θs and inferred inclination value θe. Specifically, the larger the difference between the detected inclination value θs and the inferred inclination value θe is, the greater a value to be set as the correction value CV is. For example, the difference between the detected inclination value θs and the inferred inclination value θe is calculated as the correction value CV. In the next step S21, the correction value CV, detected inclination value θs, and inferred inclination value θe are stored in the storage section 61 in the controller 60. In this embodiment, therefore, steps S20 and S21 form a correction value deriving step in which the correction value CV is derived so that the larger the difference between the detected inclination value θs and the inferred inclination value θe is, the greater the correction value CV is, after which the correction value CV is stored in the storage section 61. When the correction value CV is stored in the storage section 61, the series of processing in FIG. 8 is terminated. When a next medium M is to be transported, the process is executed in succession, starting from step S11.

When it is decided in step S11 that the medium M transported after the image reading apparatus 10 has been powered on is not a first medium M (No in S11), the process proceeds to the next step S22. In step S22, a decision is made as to whether the correction value CV is stored in the storage section 61. When the correction value CV is not stored in the storage section 61 (No in S22), the process returns to step S12 described above. When the correction value CV is stored in the storage section 61 (Yes in S22), the process proceeds to the next step S23.

In step S23, a decision is made as to whether both the electrostatic detection sensors 32A and 32B have detected the medium M. Decision processing in step S23 is the same as decision processing in step S12 described above. That is, when it is decided that at least one of the electrostatic detection sensors 32A and 32B has not detected the medium M (No in S23), a decision in step S23 is repeatedly made until both the electrostatic detection sensors 32A and 32B detect the medium M. When it decided that both the electrostatic detection sensors 32A and 32B have detected the medium M (Yes in S23), the process proceeds to step S24. In step S24, correction processing is executed by using the correction value CV, inferred inclination value θe, and detected inclination value θs stored in the storage section 61.

An example of correction processing will be described.

It will be assumed that a point in time at which the first sensor, which is the electrostatic detection sensor 32A or 32B, whichever detected the medium M earlier, is the first point in time at which the medium was detected and that a point in time at which the second sensor, which is the electrostatic detection sensor 32A or 32B, whichever detected the medium M later, is the second point in time at which the medium was detected. In correction processing executed in this embodiment, one of the first point in time and the second point in time is corrected by using the correction value CV. It is preferable to correct the first point in time or the second point in time, whichever is applicable, at which an electrostatic detection sensor detected the medium M, by using the correction value CV, the electrostatic detection sensor having an electrode the contact portion of which is positioned more upstream in the transport direction. Specifically, when the contact portion 50A of the electrostatic detection sensor 32A is positioned upstream of the contact portion 50B of the electrostatic detection sensor 32B in the transport direction, for example, the first point in time is corrected by using the correction value CV.

Figure 10:
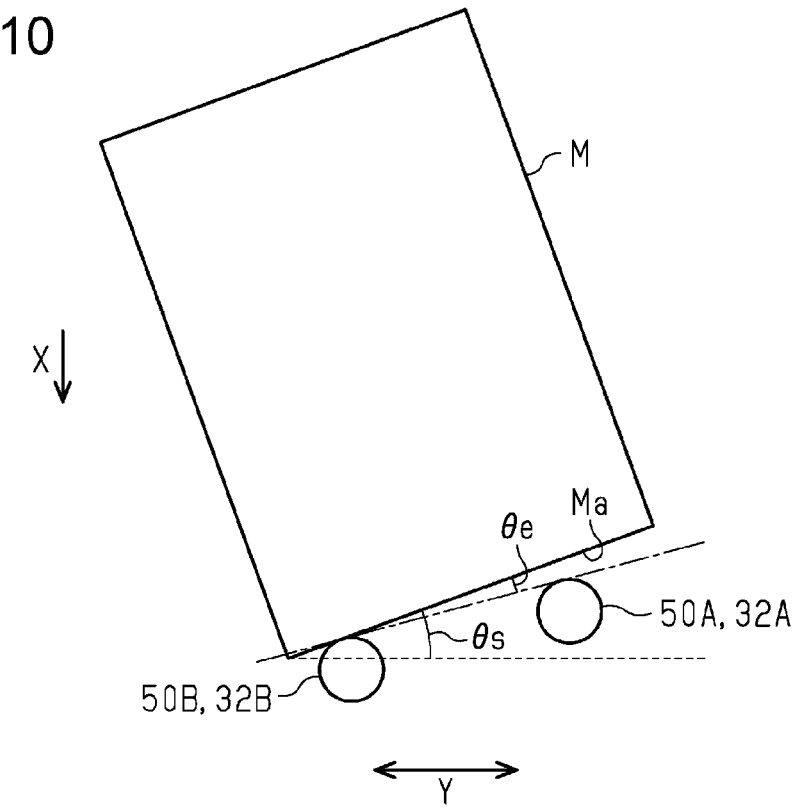
FIG. 10 schematically illustrates a comparison between an inferred inclination value and a detected inclination value when the positions of the contact portions differ from each other in the transport direction.
Figure 11:
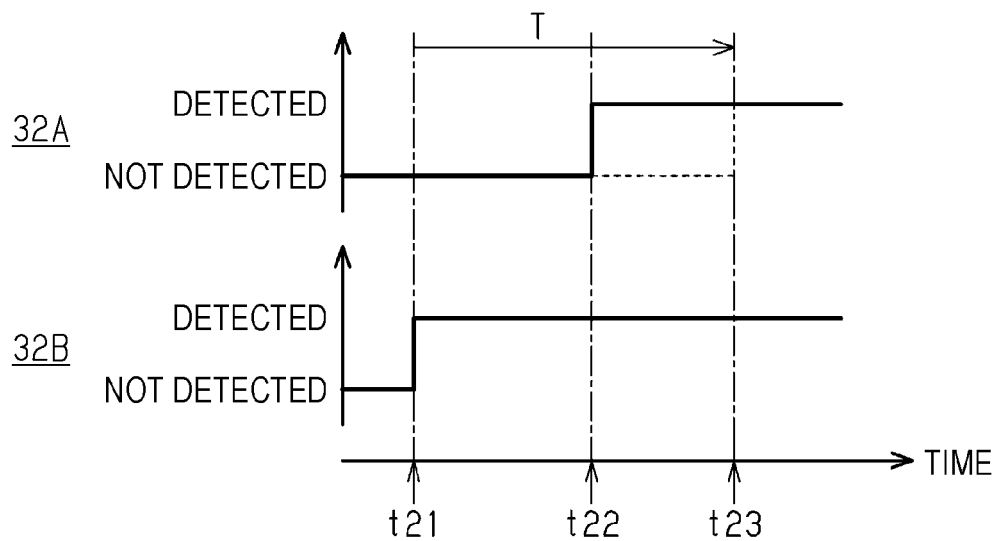
FIG. 11 is a timing diagram in correction processing.

In the example in FIG. 10, the inferred inclination value θe has the same sign (positive or negative) as the detected inclination value θs, but the absolute value of the detected inclination value θs is greater than the absolute value of the inferred inclination value θe. It will be assumed that the inferred inclination value θe and detected inclination value θs as illustrated in FIG. 10 are stored in the storage section 61 together with the correction value CV. It will also be assumed that when the medium M is inclined as illustrated in FIG. 10, the sign of the inferred inclination value θe is positive. When, as in this example, the inferred inclination value θe and detected inclination value θs are both positive values and the absolute value of the detected inclination value θs is greater than absolute value of the inferred inclination value θe, the controller 60 decides that the contact portion 50A is positioned upstream of the contact portion 50B in the transport direction.

When it is decided that the contact portion 50A is positioned upstream of the contact portion 50B in the transport direction as described above, the medium M during transport may be inclined with respect to the transport path 100 as illustrated again in FIG. 10. In this case, the contact portion 50B comes into contact with the medium M earlier than the contact portion 50A. Therefore, time t21 at which the electrostatic detection sensor 32B detected the medium M is earlier than time t22 at which the electrostatic detection sensor 32A detected the medium M, as indicated by the solid lines in FIG. 11. That is, the second point time is earlier than the first point in time on the time axis.

As described above, the controller 60 decides that the contact portion 50A is positioned upstream of the contact portion 50B in the transport direction. Therefore, the controller 60 decides that, in this transport of the medium M, the first point of time at which the electrostatic detection sensor 32A having the contact portion 50A detected the medium M is to be corrected by using the correction value CV. Accordingly, the controller 60 corrects the first point in time obtained during this transport of the medium M by using the correction value CV so that the first point in time is temporally delayed. The greater the correction value CV is, the greater the amount of this correction of the first point in time is. Preferably, under the assumption that the contact portion 50A is at the same position in the transport direction as the contact portion 50B, the controller 60 derives a time at which the contact portion 50A comes into contact with the medium M by using the correction value CV. As a result, the controller 60 assumes that the electrostatic detection sensor 32A detected the medium M at time t23, which is behind time t22, as indicated by the broken lines in FIG. 11. The difference between time t22 and time t23 is a value corresponding to the correction value CV.

The controller 60 then derives a time from time t21 to time t23 as elapsed time T. That is, it can also be said that elapsed time T has been corrected by the correction value CV.

Figure 12:
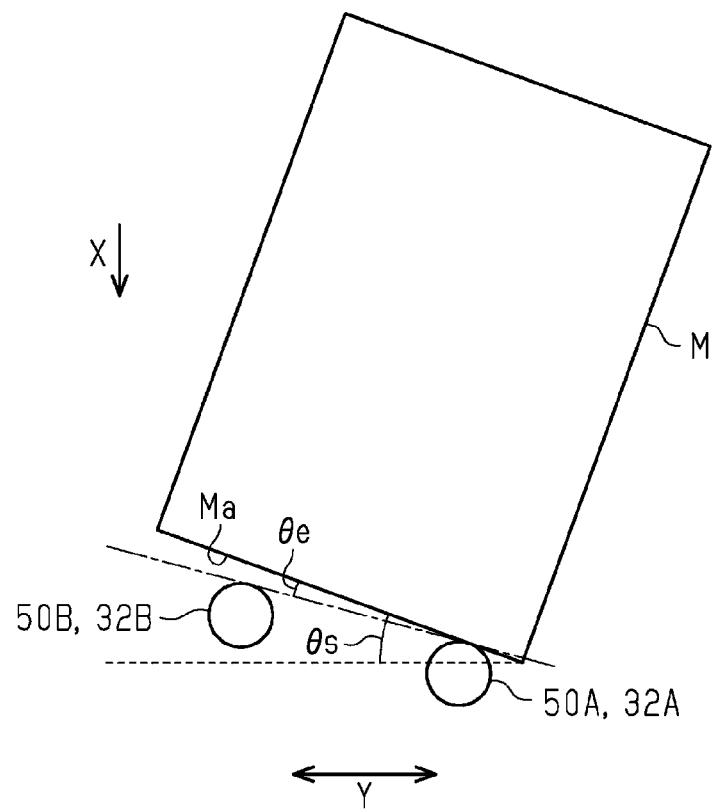
FIG. 12 schematically illustrates a comparison between the inferred inclination value and the detected inclination value when the positions of the contact portions differ from each other in the transport direction.
Figure 13:
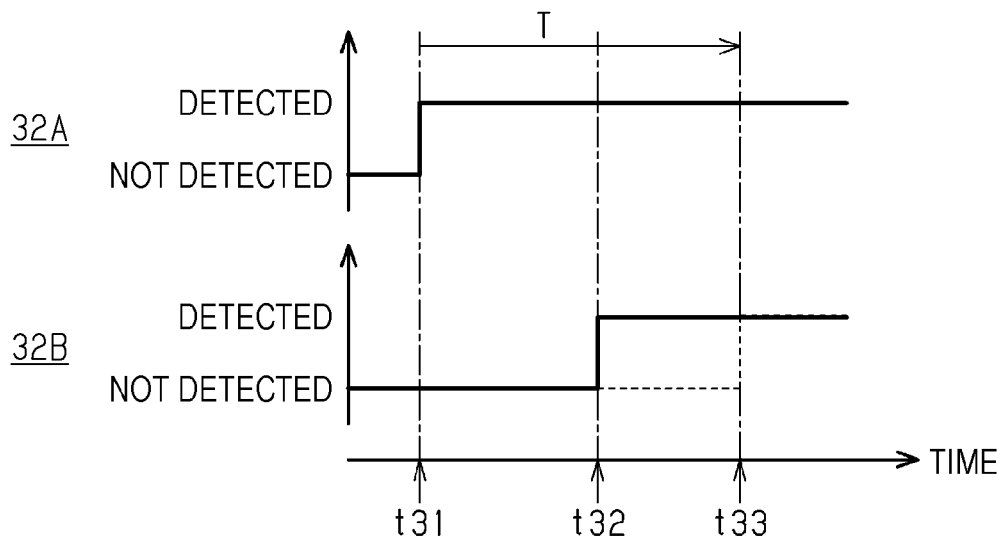
FIG. 13 is a timing diagram in correction processing.

In the example in FIG. 12, the medium M is inclined in a direction opposite to the inclination direction in the example in FIG. 10. That is, the inferred inclination value θe in FIG. 12 has a sign (positive or negative) opposite to the sign (positive or negative) of the inferred inclination value θe in FIG. 10. It will be assumed that the inferred inclination value θe and detected inclination value θs as illustrated in FIG. 12 are stored in the storage section 61 together with the correction value CV. It will also be assumed that the sign of the inferred inclination value θe in the example in FIG. 10 is positive. Then, when the medium M is inclined as illustrated in FIG. 12, the sign of the inferred inclination value θe is negative. When the inferred inclination value θe and detected inclination value θs are both negative values as in this example and the absolute value of the detected inclination value θs is greater than the absolute value of the inferred inclination value θe, the controller 60 decides that the contact portion 50B is positioned upstream of the contact portion 50A in the transport direction.

When it is decided that the contact portion 50B is positioned upstream of the contact portion 50A in the transport direction as described above, the medium M during transport may be inclined with respect to the transport path 100 as illustrated again in FIG. 12. In this case, the contact portion 50A comes into contact with the medium M earlier than the contact portion 50B. Therefore, time t31 at which the electrostatic detection sensor 32A detected the medium M is earlier than time t32 at which the electrostatic detection sensor 32B detected the medium M, as indicated by the solid lines in FIG. 13. That is, the first point time is earlier than the second point in time on the time axis.

As described above, the controller 60 decides that the contact portion 50B is positioned upstream of the contact portion 50A in the transport direction. Therefore, the controller 60 decides that, in this transport of the medium M, the second point of time at which the electrostatic detection sensor 32B having the contact portion 50B detected the medium M is to be corrected by using the correction value CV. Accordingly, the controller 60 corrects the second point in time obtained during this transport of the medium M by using the correction value CV so that the second point in time is temporally delayed. The greater the correction value CV is, the greater the amount of this correction of the second point in time is. Preferably, under the assumption that the contact portion 50B is at the same position in the transport direction as the contact portion 50A, the controller 60 derives a time at which the contact portion 50B comes into contact with the medium M by using the correction value CV. As a result, the controller 60 assumes that the electrostatic detection sensor 32B detected the medium M at time t33, which is behind time t32, as indicated by the broken lines in FIG. 13. The difference between time t32 and time t33 is a value corresponding to the correction value CV.

The controller 60 then derives a time from time t31 to time t33 as elapsed time T. That is, it can also be said that elapsed time T has been corrected by the correction value CV.

Figure 14:
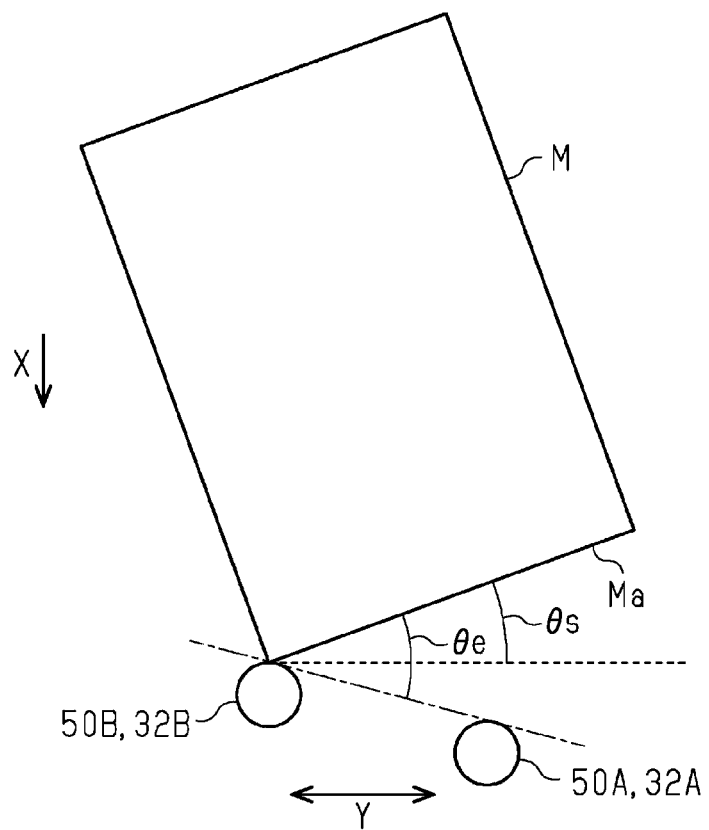
FIG. 14 schematically illustrates a comparison between the inferred inclination value and the detected inclination value when the positions of the contact portions differ from each other in the transport direction.
Figure 15:
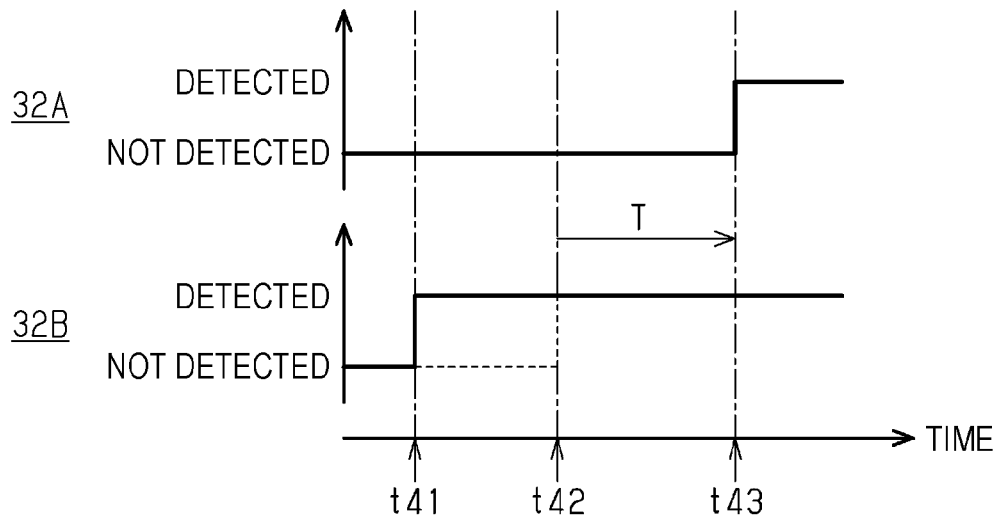
FIG. 15 is a timing diagram in correction processing.

In the example in FIG. 14, the inferred inclination value θe has the same sign (positive or negative) as the detected inclination value θs, but the absolute value of the detected inclination value θs is smaller than the absolute value of the inferred inclination value θe. It will be assumed that the inferred inclination value θe and detected inclination value θs as illustrated in FIG. 14 are stored in the storage section 61 together with the correction value CV. It will also be assumed that the inferred inclination value θe and detected inclination value θs are both positive. When, as in this example, the inferred inclination value θe and detected inclination value θs are both positive values and the absolute value of the inferred inclination value θe is greater than the absolute value of the detected inclination value θs, the controller 60 decides that the contact portion 50B is positioned upstream of the contact portion 50A in the transport direction.

When it is decided that the contact portion 50B is positioned upstream of the contact portion 50A in the transport direction as described above, the medium M during transport may be inclined with respect to the transport path 100 as illustrated again in FIG. 14. In this case, the contact portion 50B comes into contact with the medium M earlier than the contact portion 50A. Therefore, time t41 at which the electrostatic detection sensor 32B detected the medium M is earlier than time t43 at which the electrostatic detection sensor 32A detected the medium M, as indicated by the solid lines in FIG. 15. That is, the second point time is earlier than the first point in time on the time axis.

As described above, the controller 60 decides that the contact portion 50B is positioned upstream of the contact portion 50A in the transport direction. Therefore, the controller 60 decides that, in this transport of the medium M, the second point of time at which the electrostatic detection sensor 32B having the contact portion 50B detected the medium M is to be corrected by using the correction value CV. Accordingly, the controller 60 corrects the second point in time obtained during this transport of the medium M by using the correction value CV so that the second point in time is temporally delayed. The greater the correction value CV is, the larger the amount of this correction of the second point in time is. Preferably, under the assumption that the contact portion 50B is at the same position in the transport direction as the contact portion 50A, the controller 60 derives a time at which the contact portion 50B comes into contact with the medium M by using the correction value CV. As a result, the controller 60 assumes that the electrostatic detection sensor 32B detected the medium M at time t42, which is behind time t41, as indicated by the broken lines in FIG. 15. Time t42 is earlier than time t43. The difference between time t41 and time t42 is a value corresponding to the correction value CV.

The controller 60 then derives a time from time t42 to time t43 as elapsed time T. That is, it can also be said that elapsed time T has been corrected by the correction value CV.

Referring again to FIG. 8, upon the completion of correction processing described above, the process proceeds to the next step S25. In step S25, inclination inference processing for calculating the inferred inclination value θe is executed. In this embodiment, step S25 is equivalent to an example of the inclination inference step executed when the correction value CV is stored in the storage section 61. In inclination inference processing, relational expression (1) above is used to calculate inferred inclination value θe as in step S13 above, for example. However, a value to be assigned to T in relational expression (1) is elapsed time T derived in correction processing in step S24. This elapsed time T is elapsed time that has been corrected by using the correction value CV. Upon the completion of the calculation of the inferred inclination value θe, the process returns to step S14 described above.

In step S25, even when the correction value CV is stored in the storage section 61, it is preferable to calculate the inferred inclination value θe without considering the correction value CV, besides calculating the inferred inclination value θe calculated in consideration of the correction value CV. The inferred inclination value θe calculated without considering the correction value CV will be referred to as the non-corrected inferred inclination value θe1. In step S20 executed after step S25, it is preferable to calculate the correction value CV so that the larger the difference between the detected inclination value θs derived in step S19 and the non-corrected inferred inclination value θe1 is, the greater the CV is. In the next step S21, it is further preferable to store the correction value CV, detected inclination value θs, and non-corrected inferred inclination value θe1 in the storage section 61.

According to the above embodiment, effects and advantages as described below can be obtained.

1. When at least one of the electrodes 41 is deformed, the positional relationship between the contact portion 50A of the electrostatic detection sensor 32A and the contact portion 50B of the electrostatic detection sensor 32B may vary in the transport direction of the medium M. When the positional relationship between the contact portion 50A and 50B varies in the transport direction, the calculation accuracy of the inferred inclination value θe may be lowered.

In this embodiment, therefore, when images on the medium M are read by the readers 12 and 13, the detected inclination value θs is derived in inclination detection processing according to the result of the reading. It can be inferred that the larger the difference between the detected inclination value θs and the inferred inclination value θe is, the larger the deviation between the contact portions 50A and 50B in the transport direction is. In correction value deriving processing, therefore, the correction value CV is derived according to the difference between the detected inclination value θs and the inferred inclination value θe, and the correction value CV is stored in the storage section 61.

When the medium M is transported along the transport path 100 with the correction value CV stored in the storage section 61, in inclination inference processing, the inferred inclination value θe is calculated by using the correction value CV stored in the storage section 61. That is, the inferred inclination value θe can be calculated in consideration of the deviation between the contact portions 50A and 50B in the transport direction. As a result, it is possible to suppress a drop in the calculation accuracy of the inferred inclination value θe, the drop being caused due to the deformation of at least one of the electrodes 41.

2. In inclination inference processing executed in this embodiment, one of the first point in time and the second point in time is corrected by using the correction value CV. Specifically, elapsed time T, which is the difference in time between the first point in time and the second point in time, is corrected, after which the inferred inclination value θe is calculated by using the corrected elapsed time T. Thus, the inferred inclination value θe can be calculated in consideration of the deviation between the contact portions 50A and 50B in the transport direction.

3. Each electrode 41 is structured so that the fibers 45 extend downward from the base 46. Therefore, the fibers 45 of each electrode 41 are more likely to come into contact with the medium M transported along the transport path 100 than when the electrode 41 is provided so that the fibers 45 extend upward from the base 46. This can raise accuracy with which the electrostatic detection sensors 32A and 32B detect the medium M.

4. The electrodes 41 are disposed upstream of the detection sensor 31 in the transport direction. Therefore, the medium M transported along the transport path 100 can be detected at an early time by the electrostatic detection sensors 32A and 32B. Therefore, when the inferred inclination value θe becomes the inclination decision value θTh or greater, the transport of the medium M can be ceased at an early stage. This makes it possible to protect the medium M.

5. When the correction value CV is stored in the storage section 61, the inferred inclination value θe calculated by using the correction value CV is used to decide whether to cease the transport of the medium M. Therefore, when the deviation between the contact portions 50A and 50B in the transport direction is large, it is possible to restrain the transport of the medium M from being unnecessarily ceased when the inclination of the medium M with respect to the transport path 100 is small to the extent that the transport of the medium M does not essentially need to be ceased.

The above embodiment can be modified and practiced as described below. The above embodiment and variations described below can be combined within a range in which any mutual contradiction does not occur from a technical viewpoint.

The storage section 61 may be formed by a non-volatile memory. In this case, even when the image reading apparatus 10 is powered off, the correction value CV stored in the storage section 61 is not deleted. When the image reading apparatus 10 is powered on again later, the correction value CV is still stored in the storage section 61. Therefore, even in the transport of a first medium M after power is turned on, inclination inference processing applicable when the correction value CV is stored in the storage section 61 may be executed.

When decision processing in step S11 illustrated in FIG. 8 is executed, the storage section 61 may not be formed by a non-volatile memory.

In step S25 in the above embodiment, the non-corrected inferred inclination value θe1, in which the correction value CV is not reflected, has been calculated besides the inferred inclination value θe, in which the correction value CV is reflected. In step S20 executed after step S25, a new correction value CV has been calculated by using the non-corrected inferred inclination value θe1. In the next step S21, the new correction value CV has been stored in the storage section 61. In step S25, however, the non-corrected inferred inclination value θe1 may not be calculated. In this case, in step S20 executed after step S25, it suffices to calculate an amount ΔCV by which the correction value CV is updated according to the difference between the inferred inclination value θe and the detected inclination value θs. The amount ΔCV of update is calculated so that the larger the difference is, the larger the amount ΔCV of update is. Then, the sum of the correction value CV stored in the storage section 61 and the amount ΔCV of update may be calculated as the new correction value CV, after which, in the next step S21, the new correction value CV may be stored in the storage section 61. Even in this case, an effect equivalent to that in the above embodiment can be obtained.

In the above embodiment, a time at which the contact portion 50A or 50B, whichever is positioned more upstream in the transport direction, comes into contact with the medium M has been corrected by using the correction value CV. However, a time at which the contact portion 50A or 50B, whichever is positioned more downstream X in the transport direction, comes into contact with the medium M has been corrected by using the correction value CV.

Alternatively, either of the contact portions 50A and 50B may be determined as the contact portion that is always used in the correction of a time of a contact with the medium M, regardless of the positional relationship between the contact portions 50A and 50B in the transport direction.

In the above embodiment, the correction value CV stored in the storage section 61 has been used to correct one of the first point in time and the second point in time. However, the correction value CV may be used to correct another parameter.

For example, the correction value CV may be used to correct the position of the contact portion of one of the contact portions 50A and 50B in the transport direction. Correction processing in this case will be described with reference to FIGS. 16 and 17. With the contact portion 50B of the electrostatic detection sensor 32B taken as a reference position, the coordinates of the contact portion 50B are assumed to be (0, 0) and the coordinates of the contact portion 50A of the electrostatic detection sensor 32A are assumed to be (Y1, 0). Y1 is a value corresponding to the inter-electrode distance Dy.

Figure 16:
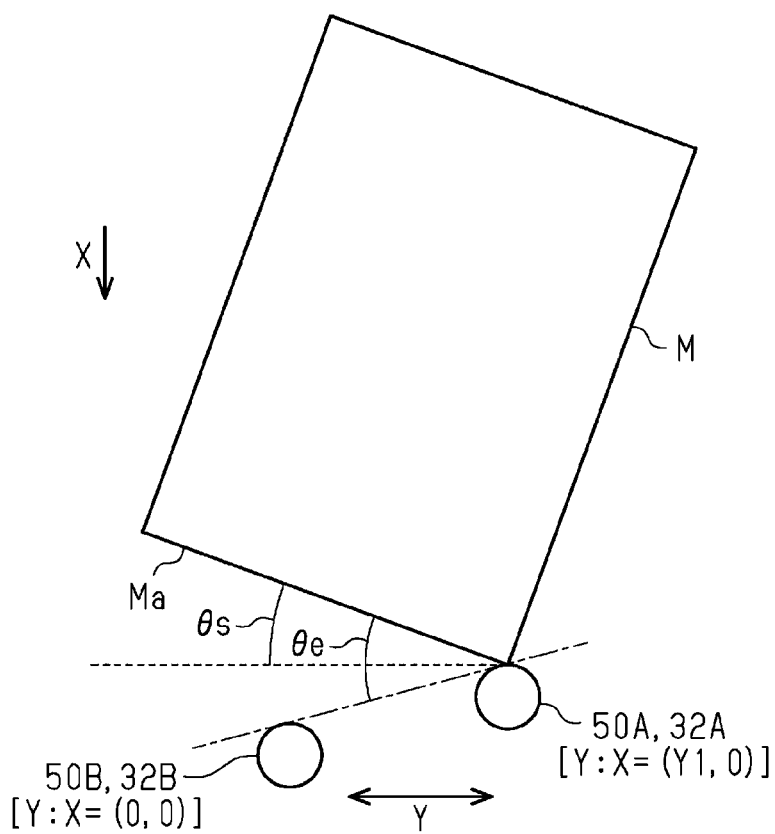
FIG. 16 schematically illustrates a comparison in a variation between the inferred inclination value and the detected inclination value when the positions of the contact portions differ from each other in the transport direction.

When, for example, the medium M is inclined with respect to the transport path 100 as illustrated in FIG. 16, the medium M is detected by the electrostatic detection sensor 32A, after which the medium M is detected by the electrostatic detection sensor 32B. Then, the inferred inclination value θe is calculated in inclination inference processing. In the example in FIG. 16, the absolute value of the detected inclination value θs derived in subsequent inclination inference processing is smaller than the absolute value of the inferred inclination value θe. Therefore, it is found that the contact portion 50A is positioned upstream of the contact portion 50B in the transport direction.

Figure 17:
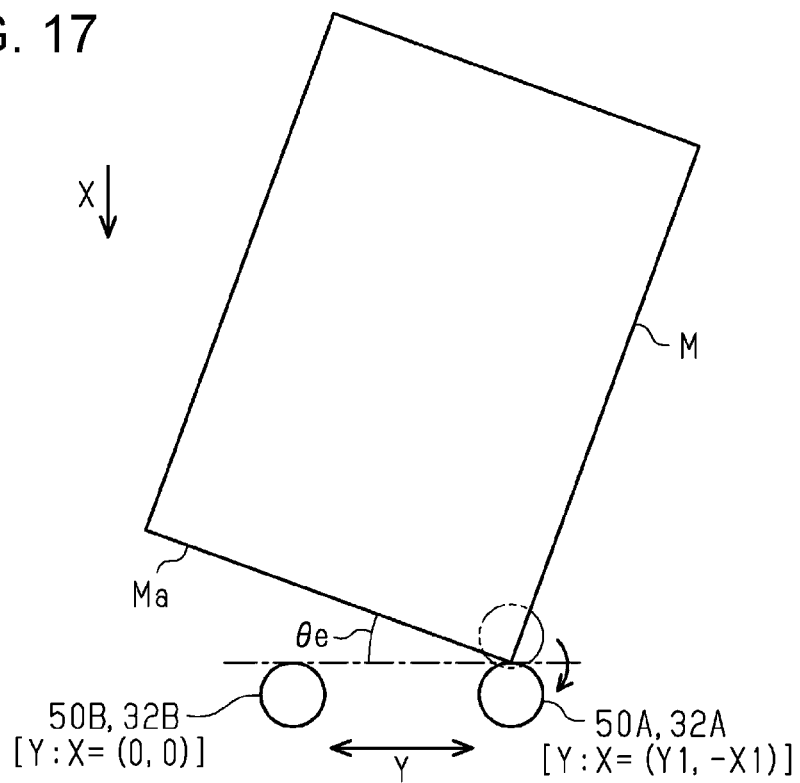
FIG. 17 schematically illustrates a state in a variation in which the position of one of the two contact portions in the transport direction has been corrected in correction processing.

In correction processing, therefore, the component of coordinates (Y1, 0) of the contact portion 50A in the transport direction is corrected so as to be moved toward the downstream. Specifically, the coordinates of the contact portion 50A are corrected from (Y1, 0) to (Y1, −X1) as illustrated in FIG. 17. The greater the correction value CV is, the greater the value of X1 to be set is. This correction of the coordinates of the contact portion 50A is performed by using the detected inclination value θs and inferred inclination value θe stored in the storage section 61 together with the correction value CV.

In inclination inference processing subsequently executed, the inferred inclination value θe is calculated by using, for example, relational expression (2) below. Even in this case, the inferred inclination value θe can be calculated in consideration of the deviation between the contact portions 50A and 50B in the transport direction.

$$\theta e = \arctan\left(\frac{T \cdot S - X1}{Dy}\right) \quad (2)$$

When the amount of transport of the medium M can be detected, in inclination inference processing, the inferred inclination value θe may be calculated by using the amount Dx of travel of the medium M from the first point in time at which one of the two electrostatic detection sensors 32A and 32B detects the medium M to the second point in time at which the other detects the medium M. In this case the inferred inclination value θe is calculated by using, for example, relational expression (3) below.

$$\theta e = \arctan\left(\frac{Dx}{Dy}\right) \quad (3)$$

When the correction value CV, inferred inclination value θe, and detected inclination value θs, are stored in the storage section 61, the amount Dx of travel of the medium M from the first point in time to the second point in time may be corrected by using the correction value CV.

Figure 18:
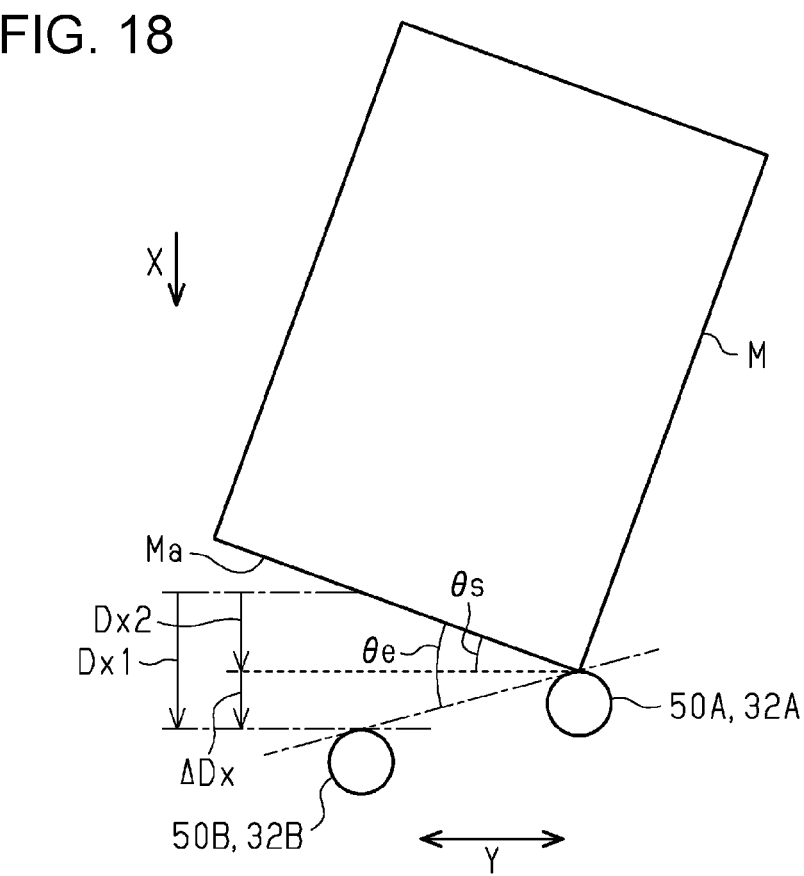
FIG. 18 schematically illustrates a state in a variation in which the amount of travel of the medium has been corrected when the medium traveled from when the medium came contact into one of the two contact portion until the medium came contact into the other.

When, for example, the medium M is inclined with respect to the transport path 100 as illustrated in FIG. 18, the medium M is detected by the electrostatic detection sensor 32A, after which the medium M is detected by the electrostatic detection sensor 32B. Then, the inferred inclination value θe is calculated in inclination inference processing. In the example in FIG. 18, the absolute value of the detected inclination value θs derived in subsequent inclination inference processing is smaller than the absolute value of the inferred inclination value θe. Therefore, it is found that the contact portion 50A is positioned upstream of the contact portion 50B in the transport direction.

Therefore, in correction processing executed during the next and later transport of the medium M, the amount Dx of travel described above is corrected. The amount Dx of travel before correction is assumed to be the non-corrected amount Dx1 of travel. When the medium M during transport is inclined as illustrated in FIG. 18, the derived non-corrected amount Dx1 of travel is corrected so that it is reduced. In this case, the greater the correction value CV is, the larger the amount ΔDx of reduction for correction is. Specifically, the amount ΔDx of reduction for correction is equivalent to the amount of deviation between the contact portions 50A and 50B in the transport direction. The amount ΔDx of reduction for correction is subtracted from the non-corrected amount Dx1 of travel to derive the corrected amount Dx2 of travel.

In inclination inference processing subsequently executed after the corrected amount Dx2 of travel has been derived, the inferred inclination value θe is calculated by using relational expression (3) above. In this calculation, the corrected amount Dx2 of travel is assigned to Dx in relational expression (3). Even in this case, the inferred inclination value θe can be calculated in consideration of the deviation between the contact portions 50A and 50B in the transport direction.

The medium transporting device 20 may have three or more electrostatic detection sensors. Even in this case, the electrodes 41 may be disposed at different positions in the width direction Y. Alternatively, some of the electrodes 41 may be disposed at positions different from the positions of the remaining electrodes 41 in the transport direction.

As long as the medium M can be transported toward the downstream X by the rotation of the supply roller 21, the medium transporting device 20 may lack the nipper 22.

As long as the charge detection circuit 42 is structured so that the larger the amount of charge moved from the medium M to the electrodes 41 is, the larger the magnitude of the signal output from the electrode 41 is, the charge detection circuit 42 may have a structure different from the structure illustrated in FIG. 3.

When the correction value CV stored in the storage section 61 is equal to or greater than a predetermined threshold, it may be decided that the deviation between the contact portions 50A and 50B is too large and thereby a prompt to perform maintenance for the medium transporting device 20 may be indicated.

The controller 60 may be structured as a circuit including one or more special hardware circuits or a combination of these special hardware circuits. Examples of one more special hardware circuits are one or more processors that operate according to computer programs and special hardware that executes at least part of various processing. Examples of special hardware include application-specific integrated circuits (ASICs). Each processor includes a central processing unit (CPU) and memories such as a random-access memory (RAM) and a read-only memory (ROM). The memories stores program code or commands configured to have the CPU execute processing. The memories, that is, storage media, include all types of available media accessible to genera-purpose or special computers.

The technical concept comprehended from the embodiment and variations described above as well as effects of the technical concept will be described below.

A. An image reading apparatus has: a reader that reads an image on a medium transported along a transport path; a supply roller disposed upstream of the reader on the transport path, the supply roller being rotated to transport the medium; a plurality of electrodes disposed between the supply roller and the reader on the transport path, the plurality of electrodes having conductivity; a first charge detection circuit that, when the medium comes into contact with a first electrode of the plurality of electrodes, outputs a signal with a magnitude matching the amount of movement of charge from the medium to the first electrode; a second charge detection circuit that, when the medium comes into contact with a second electrode of the plurality of electrodes, the second electrode being disposed at a position different from the position of the first electrode in the width direction of the medium, outputs a signal with a magnitude matching the amount of movement of charge from the medium to the second electrode; and a controller that executes inclination inference processing for calculating the inclination of the medium with respect to the transport path as an inferred inclination value, according to a change in the signal output from the first charge detection circuit and to a change in the signal output from the second charge detection circuit. Each of the first electrode and second electrode has a plurality of fibers having conductivity. The controller executes inclination detection processing for, when the reader reads an image on the medium, deriving the inclination of the medium with respect to the transport path as a detected inclination value according to the result of the reading. The controller also executes correction value deriving processing for deriving a correction value so that the larger the difference between the detected inclination value and the inferred inclination value is, the greater the correction value is, and then for storing the correction value in a storage section. In addition, when, in the inclination inference processing, the correction value is stored in the storage section, the controller also uses the correction value to calculate the inferred inclination value.

When the medium is transported along the transport path by the rotation of the supply roller, the medium rubs against the supply roller, generating static electricity between the medium and the supply roller. That is, the medium is charged. While the charged medium is being transported, it comes into contact with an electrode. Then, charge moves from the medium to the electrode, and the relevant charge detection circuit outputs a signal with a magnitude matching the amount of movement of charge from the medium to the electrode. Therefore, the controller can decide whether the medium is in contact with an electrode, according to a change in the magnitude of the signal output from the charge detection circuit.

The first electrode and second electrode each include a plurality of fibers. Therefore, the first electrode and second electrode may be deformed. When at least one of the first electrode and second electrode is deformed, a change may occur in the positional relationship between a first contact portion, of the first electrode, which comes into contact with the media, and a second contact portion, of the second electrode, which comes into contact with the media, in the transport direction of the medium. When the positional relationship between the first contact portion and the second contact portion changes in the transport direction, accuracy with which the inferred inclination value is calculated in inclination inference processing may be lowered.

In the above structure, therefore, when an image is read by the reader, a detected inclination value is derived from the reading result at that time. It can be inferred that the larger the difference between the detected inclination value and the inferred inclination value is, the more the shape of at least one of the first electrode and second electrode is deformed. In correction value deriving processing, therefore, a correction value is derived according to the difference between the detected inclination value and the inferred inclination value, after which the correction value is stored in the storage section.

When the medium is transported along the transport path with a correction value stored in the storage section as described above, the inferred inclination value is calculated in inclination inference processing by using the correction value stored in the storage section. That is, the inferred inclination value can be calculated in consideration of the deviation between the first contact portion and the second contact portion in the transport direction. Therefore, it is possible to suppress a drop in the calculation accuracy of the inferred inclination value, the drop being caused by the deformation of the shape of at least one of the first electrode and second electrode.

B. In an aspect of the image reading apparatus, assuming that when the medium is transported along the transport path from the upstream in the transport direction toward the downstream, the magnitude of the signal output from the first charge detection circuit becomes equal to or greater than a detection decision value at a first point in time and the magnitude of the signal output from the second charge detection circuit becomes equal to or greater than a detection decision value at a second point in time, the controller calculates the inferred inclination value in the inclination inference processing so that when the medium is transported along the transport path from the upstream in the transport direction toward the downstream, the larger the difference in time between the first point in time and the second point in time is, the greater the inferred inclination value is. In this case, when, in the inclination inference processing, the correction value is stored in the storage section, the controller corrects any one of the first point in time and the second point in time by using the correction value, after which the controller derives the difference in time and calculates the inferred inclination value according to the difference in time.

With the structure described above, in inclination inference processing, the inferred inclination value is calculated according to the difference in time between the first point in time and the second point in time. In inclination inference processing with a correction value stored in the storage section, any one of the first point in time and the second point in time is corrected by using the correction value. For example, one of these points in time may be corrected so as to be earlier than or later than a point in time at which the medium actually came into contact with the electrode. This indicates that the difference in time has been corrected by using the correction value. Then, the inferred inclination value is calculated according to the corrected difference in time. That is, the inferred inclination value can be calculated in consideration of the deviation between the first contact portion and the second contact portion in the transport direction.

C. In an aspect of the image reading apparatus, when, in the inclination inference processing, the correction value is stored in the storage section, the controller corrects the first point in time by using the correction value when the top of the first electrode is positioned upstream of the top of the second electrode in the transport direction, and corrects the second point in time by using the correction value when the top of the second electrode is positioned upstream of the top of the first electrode in the transport direction.

The medium is transported along the transport path from the upstream in the transport direction toward the downstream. Therefore, the fibers of the electrode are likely to be deformed in such a way that the top of each fiber is displaced toward the downstream in the transport direction. In other words, when the top of the fiber is displaced toward the upstream in the transport direction, there may be any abnormality.

With the structure described above, in inclination inference processing with a correction value stored in the storage section, one of the first electrode and second electrode, the top of which is positioned more upstream in the transport direction, is detected. The top of each fiber of the electrode detected like this may have been displaced from an initial position toward the upstream in the transport direction. The initial position is a position in the transport direction at which the top of each fiber is positioned when the image reading apparatus is manufactured. A point in time at which the media was detected by the detected electrode is corrected.

D. In an aspect of the image reading apparatus, assuming that when the medium is transported along the transport path from the upstream in the transport direction toward the downstream, the magnitude of the signal output from the first charge detection circuit becomes equal to or greater than a detection decision value at a first point in time and the magnitude of the signal output from the second charge detection circuit becomes equal to or greater than a detection decision value at a second point in time, the controller calculates the inferred inclination value in the inclination inference processing so that when the medium is transported along the transport path from the upstream in the transport direction toward the downstream, the larger the difference in time between the first point in time and the second point in time is, the greater the inferred inclination value is. In this case, when, in the inclination inference processing, the correction value is stored in the storage section, the controller corrects the position of any one of the first electrode and second electrode in the transport direction by using the correction value, after which the controller calculates the inferred inclination value of the medium.

With the structure described above, in inclination inference processing with a correction value stored in the storage section, any one of a first contact position and a second contact position in the transport direction is corrected by using the correction value. For example, one of these contact positions may be corrected so as to be upstream or downstream of a contract position set in specifications. This indicates that one of the first point in time and the second point in time, the one corresponding to the corrected contact position, has been corrected by using the correct value, and thereby indicates that the above difference in time has been corrected by using the correction value. Then, the inferred inclination value is calculated according to the corrected difference in time. That is, the inferred inclination value can be calculated in consideration of the deviation between the first contact portion and the second contact portion in the transport direction.

E. In an aspect of the image reading apparatus, assuming that when the medium is transported along the transport path from the upstream in the transport direction toward the downstream, the magnitude of the signal output from the first charge detection circuit becomes equal to or greater than a detection decision value at a first point in time and the magnitude of the signal output from the second charge detection circuit becomes equal to or greater than a detection decision value at a second point in time, the controller calculates the inferred inclination value in the inclination inference processing so that when the medium is transported along the transport path from the upstream in the transport direction toward the downstream, the larger the amount of travel of the medium from the first point in time to the second point in time is, the greater the inferred inclination value is. In this case, when, in the inclination inference processing, the correction value is stored in the storage section, the controller corrects the amount of travel of the medium from the first point in time to the second point in time by using the correction value, after which the controller calculates the inferred inclination value according to the corrected amount of travel.

With the structure described above, in inclination inference processing, the inferred inclination value is calculated according to the amount of travel of the medium from the first point in time to the second point in time. In inclination inference processing with a correction value stored in the storage section, the amount of travel of the medium from the first point in time to the second point in time is corrected by using the correction value. Then, the inferred inclination value is calculated according to the corrected amount of travel. That is, the inferred inclination value can be calculated in consideration of the deviation between the first contact portion and the second contact portion in the transport direction.

F. In an aspect of the image reading apparatus, the first electrode and second electrode each have a base, and are structured so that the fibers hang down from the base.

With the structure described above, the medium transported along the transport path becomes likely to come into contact with the fibers of the electrode.

G. In an aspect of the image reading apparatus, a detection sensor that detects an edge of the medium is disposed between the supply roller and the reader on the transport path. In this case, the first electrode and second electrode are disposed between the detection sensor and the supply roller on the transport path.

With the structure described above, the first electrode and second electrode are disposed upstream of the detection sensor in the transport direction. Therefore, the medium transported along the transport path can be detected at an early time by the electrodes.

H. In an aspect of the image reading apparatus, when the inferred inclination value is equal to or greater than an inclination decision value, the controller ceases the transport of the medium.

With the structure described above, when the inclination of the medium with respect to the transport path is large, part of the medium may be displaced to the outside and thereby the medium may be damaged. Therefore, when the inferred inclination value is equal to or greater than the inclination decision value, the transport of the medium is ceased. This protects the medium.

I. A method of calculating a medium inclination in an image reading apparatus is applied to an image reading apparatus that has: a reader that reads an image on a medium transported along a transport path; a supply roller disposed upstream of the reader on the transport path, the supply roller being rotated to transport the medium; a plurality of electrodes disposed between the supply roller and the reader on the transport path, the plurality of electrodes having conductivity; a first charge detection circuit that, when the medium comes into contact with a first electrode of the plurality of electrodes, outputs a signal with a magnitude matching the amount of movement of charge from the medium to the first electrode; and a second charge detection circuit that, when the medium comes into contact with a second electrode of the plurality of electrodes, the second electrode being disposed at a position different from the position of the first electrode in the width direction of the medium, outputs a signal with a magnitude matching the amount of movement of charge from the medium to the second electrode; each of the first electrode and second electrode has a plurality of conductive fibers having conductivity. In this method, a controller in the image reading apparatus is caused to execute: an inclination inference step of calculating the inclination of the medium with respect to the transport path as an inferred inclination value, according to a change in the signal output from the first charge detection circuit and to a change in the signal output from the second charge detection circuit; an inclination detection step for deriving, when the reader reads an image on the medium, the inclination of the medium with respect to the transport path as a detected inclination value according to the result of the reading; and a correction value deriving step of deriving a correction value so that the larger the difference between the detected inclination value and the inferred inclination value is, the greater the correction value is, and then of storing the correction value in a storage section. In addition, when, in the inclination inference step, the correction value is stored in the storage section, the correction value is also used to calculate the inferred inclination value.

With the structure described above, an effect equivalent to that of the image reading apparatus described above can be obtained.

What is claimed is:

1. An image reading apparatus comprising:
   a reader configured to read an image on a medium transported along a transport path;
   a supply roller disposed upstream of the reader on the transport path, the supply roller transporting the medium;
   a plurality of electrodes disposed between the supply roller and the reader on the transport path, the plurality of electrodes having conductivity;
   a first charge detection circuit configured to, when the medium comes into contact with a first electrode of the plurality of electrodes, output a signal with a magnitude matching an amount of movement of charge from the medium to the first electrode;
   a second charge detection circuit configured to, when the medium comes into contact with a second electrode of the plurality of electrodes, the second electrode being disposed at a position different from a position of the first electrode in a width direction of the medium, output a signal with a magnitude matching an amount of movement of charge from the medium to the second electrode; and
   a controller configured to execute inclination inference processing for calculating an inclination of the medium with respect to the transport path as an inferred inclination value, according to a change in the signal output from the first charge detection circuit and to a change in the signal output from the second charge detection circuit; wherein
the controller executes
inclination detection processing for deriving the inclination of the medium with respect to the transport path as a detected inclination value according to a result of reading the image on the medium, and
correction value deriving processing for deriving a correction value according to a difference between the detected inclination value and the inferred inclination value and then for storing the correction value in a storage section, and
when, in the inclination inference processing, the correction value is stored in the storage section, the controller uses the correction value to calculate the inferred inclination value.

2. The image reading apparatus according to claim 1, wherein assuming that when the medium is transported along the transport path from an upstream in the transport direction toward a downstream, the magnitude of the signal output from the first charge detection circuit becomes equal to or greater than a detection decision value at a first point in time and the magnitude of the signal output from the second charge detection circuit becomes equal to or greater than a detection decision value at a second point in time,
the controller calculates the inferred inclination value in the inclination inference processing so that when the medium is transported along the transport path from the upstream in the transport direction toward the downstream, the inferred inclination value is increased as a difference in time between the first point in time and the second point in time is increased, and
in the inclination inference processing, the controller corrects any one of the first point in time and the second point in time by using the correction value stored in the storage section, after which the controller calculates the inferred inclination value according to the difference in time.

3. The image reading apparatus according to claim 2, wherein, in the inclination inference processing, the controller corrects the first point in time by using the correction value stored in the storage section when a top of the first electrode is positioned upstream of a top of the second electrode in the transport direction, and corrects the second point in time by using the correction value when the top of the second electrode is positioned upstream of the top of the first electrode in the transport direction.

4. The image reading apparatus according to claim 1, wherein assuming that when the medium is transported along the transport path from an upstream in the transport direction toward a downstream, the magnitude of the signal output from the first charge detection circuit becomes equal to or greater than a detection decision value at a first point in time and the magnitude of the signal output from the second charge detection circuit becomes equal to or greater than a detection decision value at a second point in time,
the controller calculates the inferred inclination value in the inclination inference processing so that when the medium is transported along the transport path from the upstream in the transport direction toward the downstream, the inferred inclination value is increased as a difference in time between the first point in time and the second point in time is increased, and
in the inclination inference processing, the controller corrects the position of any one of the first electrode and the second point in the transport direction by using the correction value stored in the storage section, after which the controller calculates the inferred inclination value.

5. The image reading apparatus according to claim 1, wherein assuming that when the medium is transported along the transport path from an upstream in the transport direction toward a downstream, the magnitude of the signal output from the first charge detection circuit becomes equal to or greater than a detection decision value at a first point in time and the magnitude of the signal output from the second charge detection circuit becomes equal to or greater than a detection decision value at a second point in time,
the controller calculates the inferred inclination value in the inclination inference processing so that when the medium is transported along the transport path from the upstream in the transport direction toward the downstream, the inferred inclination value is increased as an amount of travel of the medium from the first point in time to the second point in time is increased, and
in the inclination inference processing, the controller corrects the amount of travel of the medium from the first point in time to the second point in time by using the correction value stored in the storage section, after which the controller calculates the inferred inclination value according to the corrected amount of travel.

6. The image reading apparatus according to claim 1, wherein:
the first electrode and the second electrode each have a base and a plurality of fibers having conductivity; and
each of the plurality of fibers is formed so as to hang down from the base.

7. The image reading apparatus according to claim 1, further comprising a detection sensor configured to detect an edge of the medium, the detection sensor being disposed between the supply roller and the reader on the transport path, wherein
the first electrode and the second electrode are disposed between the detection sensor and the supply roller on the transport path.

8. The image reading apparatus according to claim 1, wherein when the inferred inclination value is equal to or greater than an inclination decision value, the controller ceases a transport of the medium.

9. A method of calculating a medium inclination in an image reading apparatus, the method comprising:
a reading step of reading, by a reader, an image on a medium transported along a transport path;
a transporting step of transporting, by a supply roller disposed upstream of the reader, the medium on the transport path;
a first detecting step of detecting, by a first charge detection circuit, that the medium comes into contact with a first electrode of a plurality of electrodes and outputting a signal with a magnitude matching an amount of movement of charge from the medium to the first electrode;
a second detecting step of detecting, by a second charge detection circuit, that the medium comes into contact with a second electrode of the plurality of electrodes disposed at a position different from a position of the first electrode in a width direction of the medium, and outputting a signal with a magnitude matching an amount of movement of charge from the medium to the second electrode;
an inclination inference step of calculating, by a controller, an inclination of the medium with respect to the transport path as an inferred inclination value, according to a change in the signal output from the first charge detection circuit and to a change in the signal output from the second charge detection circuit, an inclination detection step of deriving, by the controller, the inclination of the medium with respect to the transport path as a detected inclination value according to a result of reading the image on the medium, and a correction value deriving step of deriving, by the controller, a correction value according to a difference between the detected inclination value and the inferred inclination value and then for storing the correction value in a storage section, and in the inclination inference step of using, by the controller, the correction value stored in the storage section to calculate the inferred inclination value.

\* \* \* \* \*